(12) United States Patent
Hasegawa et al.

(10) Patent No.: US 11,451,852 B2
(45) Date of Patent: *Sep. 20, 2022

(54) INFORMATION PROCESSING APPARATUS AND INFORMATION PROCESSING METHOD

(71) Applicant: TOYOTA JIDOSHA KABUSHIKI KAISHA, Toyota (JP)

(72) Inventors: Hideo Hasegawa, Nagoya (JP); Tadahiro Kashiwai, Nagoya (JP); Yusuke Kaneko, Toyota (JP); Akihiro Yamaguchi, Toyota (JP); Yuki Ito, Iwakura (JP); Naoki Uenoyama, Nisshin (JP); Takahiro Shiga, Chiryu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/223,705

(22) Filed: Apr. 6, 2021

(65) Prior Publication Data

US 2021/0227281 A1 Jul. 22, 2021

Related U.S. Application Data

(63) Continuation of application No. 16/744,530, filed on Jan. 16, 2020, now Pat. No. 11,006,163.

(30) Foreign Application Priority Data

Feb. 19, 2019 (JP) .............................. JP2019-027736

(51) Int. Cl.
*H04N 21/414* (2011.01)
*H04N 21/2187* (2011.01)
(Continued)

(52) U.S. Cl.
CPC ..... *H04N 21/41422* (2013.01); *G06K 7/1417* (2013.01); *H04N 21/2187* (2013.01); *H04N 21/21805* (2013.01); *G01C 21/3623* (2013.01)

(58) Field of Classification Search
CPC ....... H04N 21/41422; H04N 21/21805; H04N 21/2187; H04N 21/441; H04N 21/44218;
(Continued)

(56) References Cited

U.S. PATENT DOCUMENTS 6,810,527 B1 * 10/2004 Conrad .............. H04N 21/6193
725/77
10,540,135 B1 * 1/2020 Fitzgerald ............. G06F 3/0304
(Continued)

FOREIGN PATENT DOCUMENTS

JP 2001-187180 A 7/2001
JP 2015-92320 A 5/2015
(Continued)

*Primary Examiner* — Robert J Hance
(74) *Attorney, Agent, or Firm* — Oblon, McClelland, Maier & Neustadt, L.L.P.

(57) ABSTRACT

There is provided an information processing apparatus that controls a movable body that transports a user holding an entertainment ticket to and/or from an entertainment site where an entertainment is performed, the information processing apparatus including a control unit that executes: electronically reading the entertainment ticket held by the user; identifying the entertainment site associated with the entertainment ticket; generating an instruction for causing the movable body to move for transporting the user to the identified entertainment site; receiving picture data transmitted from the identified entertainment site; and providing a picture obtained by decoding the picture data to the user on board the movable body.

12 Claims, 8 Drawing Sheets

(51) Int. Cl.
*G06K 7/14* (2006.01)
*H04N 21/218* (2011.01)
*G01C 21/36* (2006.01)

(58) Field of Classification Search
CPC .......... H04N 21/4532; H04N 21/6587; H04N 7/181; G06K 7/1417; G01C 21/3623; G05D 1/0236; G05D 1/0214; G05D 1/0223; G05D 1/0253; G05D 1/0257; G05D 1/0276; G05D 1/0278; G05D 2201/0212
See application file for complete search history.

(56) References Cited

U.S. PATENT DOCUMENTS

| | | | | |
|---|---|---|---|---|
| 2006/0211470 | A1* | 9/2006 | Walker | G07F 17/3237 463/16 |
| 2012/0298737 | A1* | 11/2012 | Thakar | B64D 11/0015 235/375 |
| 2013/0279757 | A1* | 10/2013 | Kephart | G06V 20/52 382/105 |
| 2014/0100896 | A1* | 4/2014 | Du | G06Q 10/02 705/5 |
| 2014/0304750 | A1* | 10/2014 | Lemmey | H04N 21/478 725/75 |
| 2018/0162267 | A1* | 6/2018 | Kline | B60W 50/14 |
| 2018/0202822 | A1* | 7/2018 | DeLizio | G01C 21/362 |
| 2019/0061619 | A1* | 2/2019 | Reymann | G08B 13/19647 |
| 2020/0267439 | A1* | 8/2020 | Hasegawa | H04N 21/21805 |
| 2020/0310461 | A1* | 10/2020 | Kaufman | B60W 60/00256 |

FOREIGN PATENT DOCUMENTS

| | | | | |
|---|---|---|---|---|
| JP | | 6387545 B1 | 9/2018 | |
| JP | | 2018-165091 A | 10/2018 | |
| WO | WO 2013/049408 A2 | | 4/2013 | |
| WO | WO-2013049408 A2 * | | 4/2013 | ......... G06Q 30/0207 |
| WO | WO 2014/200448 A2 | | 12/2014 | |
| WO | WO-2014200448 A2 * | | 12/2014 | ............... B61B 5/02 |

* cited by examiner

TICKET INFORMATION

| USER ID | U001 |
|---|---|
| ENTERTAINMENT SITE ID | T001 |
| RESERVED SEAT | ROW: 3, NUMBER: 14 |
| AREA | A |
| PERFORMANCE START TIME | 18:00 |
| SERIAL No. | 123456 |
| ... | ... |

FIG. 5B

ENTERTAINMENT SITE INFORMATION

| ENTERTAINMENT SITE ID | T001 |
|---|---|
| NAME | ... |
| ADDRESS | ... |
| POSITIONAL INFORMATION | ... |
| PORCH POSITION INFORMATION | ... |
| ... | ... |

FIG. 5C

PICTURE SOURCE INFORMATION

| ENTERTAINMENT SITE ID | T001 | T001 | T002 | T002 | T003 | ... |
|---|---|---|---|---|---|---|
| AREA | A | B | S | A | A | ... |
| SERVER IP | xxx.xxx.xxx.xxx | xxx.xxx.xxx.xxx | xxx.xxx.xxx.xxx | xxx.xxx.xxx.xxx | xxx.xxx.xxx.xxx | ... |
| CAMERA NUMBER | #01 | #02 | #01 | #02 | #01 | ... |
| ... | ... | ... | ... | ... | ... | ... |

INFORMATION PROCESSING APPARATUS AND INFORMATION PROCESSING METHOD

INCORPORATION BY REFERENCE

This application is a Continuation of U.S. patent application Ser. No. 16/744,530 filed on Jan. 16, 2020, which claims priority to Japanese Patent Application No. 2019-027736 filed on Feb. 19, 2019. The disclosure of U.S. patent application Ser. No. 16/744,530 filed on Jan. 16, 2020 and Japanese Patent Application No. 2019-027736 filed on Feb. 19, 2019 including the specification, drawings and abstract are incorporated herein by reference in their entirety.

BACKGROUND

1. Technical Field

The disclosure relates to a service providing mobility.

2. Description of Related Art

There have been studies to provide services using movable bodies which autonomously travel. For example, Japanese Patent Application Publication No. 2015-092320 discloses a traffic system of allocating self-driving automobiles in accordance with requests of users to transport freight and passengers.

SUMMARY

One can come up with a mode of transporting users to and/or from event venues (sites where entertainments such as sports and dramas are held) using movable bodies which autonomously travel. Under such a situation, not all the users visiting an event can arrive at the site by a performance start time of the event.

The disclosure is devised in consideration of the problem above, and an object thereof is to provide a movable body system capable of providing seamless amusement.

An information processing apparatus according to the disclosure is an information processing apparatus that controls a movable body that transports a user holding an entertainment ticket to and/or from an entertainment site where an entertainment is performed, the information processing apparatus including a control unit that executes: electronically reading the entertainment ticket held by the user; identifying the entertainment site associated with the entertainment ticket; generating an instruction for causing the movable body to move for transporting the user to the identified entertainment site; receiving picture data transmitted from the identified entertainment site; and providing a picture obtained by decoding the picture data to the user on board the movable body.

An information processing method according to the disclosure is an information processing method of controlling a movable body that transports s user holding an entertainment ticket to and/or from an entertainment site where an entertainment is performed, the information processing method including: electronically reading the entertainment ticket held by the user; identifying the entertainment site associated with the entertainment ticket; generating an instruction for causing the movable body to move for transporting the user to the identified entertainment site; and receiving picture data transmitted from the identified entertainment site; and providing a picture obtained by decoding the picture data to the user on board the movable body.

According to the disclosure, a movable body system capable of providing seamless amusement can be provided.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

The term "entertainment" in the present specification denotes an event held at a specific site, such as a sport, a drama, a play, a concert, a live performance or a cinema. Such a site where the event is held is called an entertainment site. While in the following description, a term and a phrase of a "public performance" and "a performance begins" are used, these can be replaced by those for sport games or the like. In this case, the "public performance" can be replaced by a "game", and "the performance begins" can be replaced by "a game starts".

A movable body system according to an embodiment is a system for transporting, with a movable body, a user to a site (entertainment site) where an event such as a sport, a drama or a cinema (entertainment) is to be held. Specifically, an information processing apparatus electronically reads an entertainment ticket held by the user, identifies the entertainment site associated with the entertainment ticket, and after that, generates an instruction for causing the movable body to move for transporting the user to the identified entertainment site. Even under such a situation, not every user visiting the entertainment site can arrive at the site by a performance start time.

In order to handle this, in the present embodiment, the movable body receives picture data transmitted from the entertainment site identified with the entertainment ticket, and provides it to the user on board in real time.

The picture data is data including a picture signal for relaying the content of the entertainment. For example, when a sport game is targeted, pictures acquired by cameras installed on the field and at audience seats are provided to the user on board the movable body. When a drama, a cinema, a concert or the like is targeted, pictures acquired by cameras installed in the site and at audience seats are provided to the user on board the movable body. According to this mode, since the user who is moving toward the entertainment site can watch the content of the entertainment held at the entertainment site in real time, a watching experience seamless at the entertainment site and in the vehicle can be provided.

Moreover, the picture data may include a plurality of pictures, on channels, captured by respective cameras installed at different areas in the entertainment site, and the control unit may identify an area, in the entertainment site, designated by the entertainment ticket, and extract a picture on a channel corresponding to the identified area from the picture data.

There can be a case where a seat or an area is designated by every ticket, depending on the type of an entertainment. By selecting a picture transmitted from a camera installed at the designated area, a view equivalent to that in the case where the user takes the designated seat can be provided to the user.

Moreover, when the user returns from the entertainment site, the control unit may acquire a time from user's leaving a seat to user's getting in the movable body, and provide the picture to the user with a delay of the time.

According to such a configuration, even when the user leaves the seat in the middle of the entertainment, the picture at the site can be seamlessly provided to the user. That is, the user can be allowed to more flexibly make an action schedule.

Moreover, a storage that stores a plurality of addresses of servers that distribute the picture data may be further included, and the control unit may connect to a server corresponding to the identified entertainment site.

First Embodiment

Figure 1:
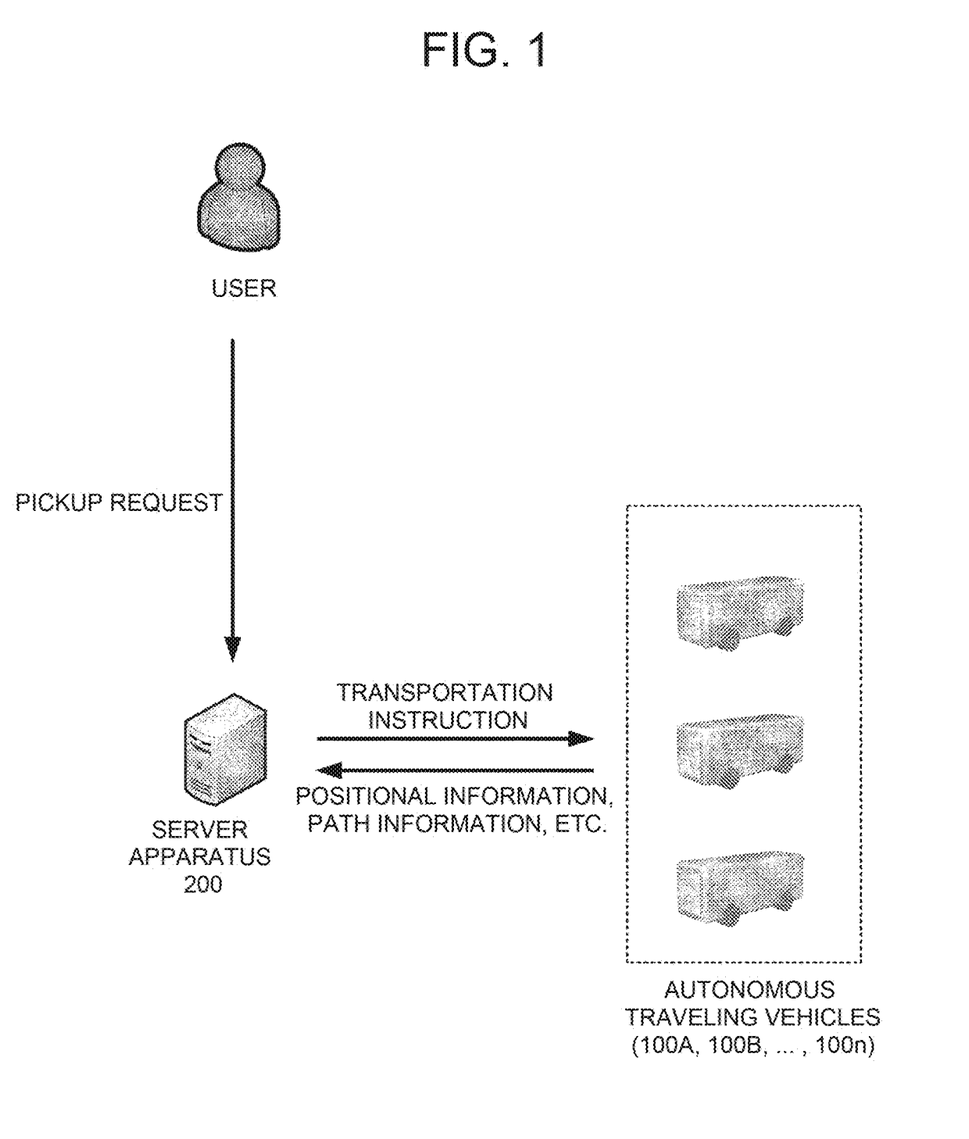
FIG. 1 is a schematic diagram of a movable body system according to an embodiment.

An outline of a movable body system according to a first embodiment is described with reference to FIG. 1. The movable body system according to the present embodiment is a system which transports a user who is going to watch an entertainment to an entertainment site on an autonomous traveling vehicle. Specifically, it includes a plurality of autonomous traveling vehicles 100A . . . 100n which autonomously travel, and a server apparatus 200 which issues instructions to the autonomous traveling vehicles. The autonomous traveling vehicles 100 are self-driving vehicles which provide predetermined services, and the server apparatus 200 is an apparatus which manages the plurality of autonomous traveling vehicles 100. The plurality of autonomous traveling vehicles are hereafter simply called the autonomous traveling vehicles 100 when they are collectively called without being individually distinguished.

In the present embodiment, a user carries an electronic ticket for watching an entertainment (hereinafter called an entertainment ticket), and gets in the autonomous traveling vehicle 100 using the electronic ticket. The autonomous traveling vehicles 100 are multipurpose movable bodies which can individually have different functions, and vehicles which can perform automated driving and unmanned driving on roads. The autonomous traveling vehicles 100 can be exemplarily any of courtesy cars which travel on predetermined routes, on-demand taxis which are operated in accordance with requests of users, mobile shops which can do business at any destinations and the like, but in the present embodiment, they are supposed to be share vehicles each of which can carry a plurality of uses to move. Such autonomous traveling vehicles 100 are also called electric vehicle (EV) pallets. Notably, each autonomous traveling vehicle 100 is not necessarily an unmanned vehicle. For example, some operating staff, some security staff and/or the like may be on board. Moreover, the autonomous traveling vehicle 100 is not necessarily a vehicle that can perform complete autonomous traveling. For example, it may be a vehicle which a person drives or assists driving depending on situations.

The server apparatus 200 is an apparatus which instructs the autonomous traveling vehicle 100 to operate. In the present embodiment, when a user who wants to move to an entertainment site transmits a pickup request to the server apparatus 200, the server apparatus 200 selects an autonomous traveling vehicle 100 that can pick up the user based on the pickup request, and transmits a transportation instruction to the autonomous traveling vehicle 100. The transportation instruction is an instruction of allowing the user to get in and transporting the user to a predetermined entertainment site with respect to the autonomous traveling vehicle 100. The transportation instruction may include, for example, information regarding a place where the user is to get in, information regarding a time point when the user wants to get in, an identifier of the user, information regarding the electronic ticket held by the user, and the like.

In the present embodiment, the server apparatus 200 manages traveling positions and traveling paths of the autonomous traveling vehicles 100, and processes pickup requests coming in real time. When receiving a pickup request from a user, the server apparatus 200 generates a transportation instruction based on the pickup request, and transmits the transportation instruction to the autonomous traveling vehicle 100. Thereby, the autonomous traveling vehicle 100 can be caused to come to the place designated by the user and allow the user to get in.

Figure 2:
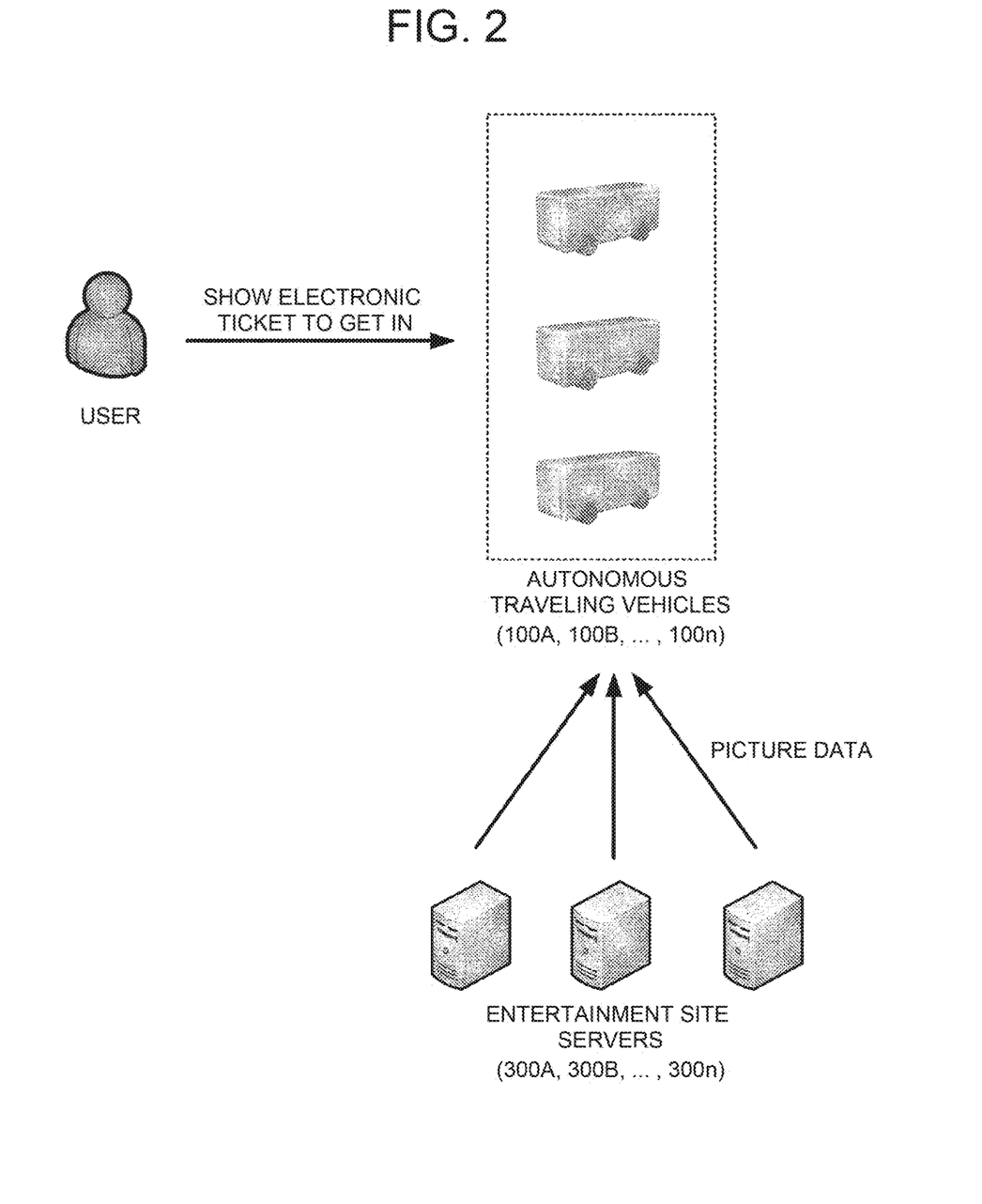
FIG. 2 is a schematic diagram of a movable body system according to an embodiment.

Next, a mode in which the user gets in the autonomous traveling vehicle 100 to move is described with reference to FIG. 2. The user having issued the pickup request shows user's carrying an electronic ticket to the autonomous traveling vehicle 100 and gets in the autonomous traveling vehicle 100. The electronic ticket may be, for example, optically read or transmitted through short range wireless communication. Moreover, the autonomous traveling vehicle 100 may allow the user to get in when the information included in the transportation instruction coincides with the information read from the electronic ticket. The autonomous traveling vehicle 100 having allowed the user to get in identifies the entertainment site where the user is going to go based on the information read from the electronic ticket, generates a traveling path, and starts to move.

Entertainment site servers 300 are apparatuses which distribute the contents of entertainments with pictures to the autonomous traveling vehicles 100. For example, when the entertainment is a drama, pictures captured by cameras installed at audience seats are distributed. When the entertainment is a sport, pictures captured by cameras installed at audience seats and on the field are distributed. Notably, the distributed pictures are not necessarily captured by cameras. For example, when the entertainment is a cinema, a picture source which is to be on screen may be directly distributed.

The autonomous traveling vehicle 100 identifies a server apparatus (entertainment site server 300) corresponding to the entertainment site where the user is going to go, receives a picture distributed from the identified entertainment site server 300, and provides it to the user on board. The user thereby can watch the entertainment even in the case of being late to arrive at the entertainment site for the time of performance start (game starting).

Figure 3:
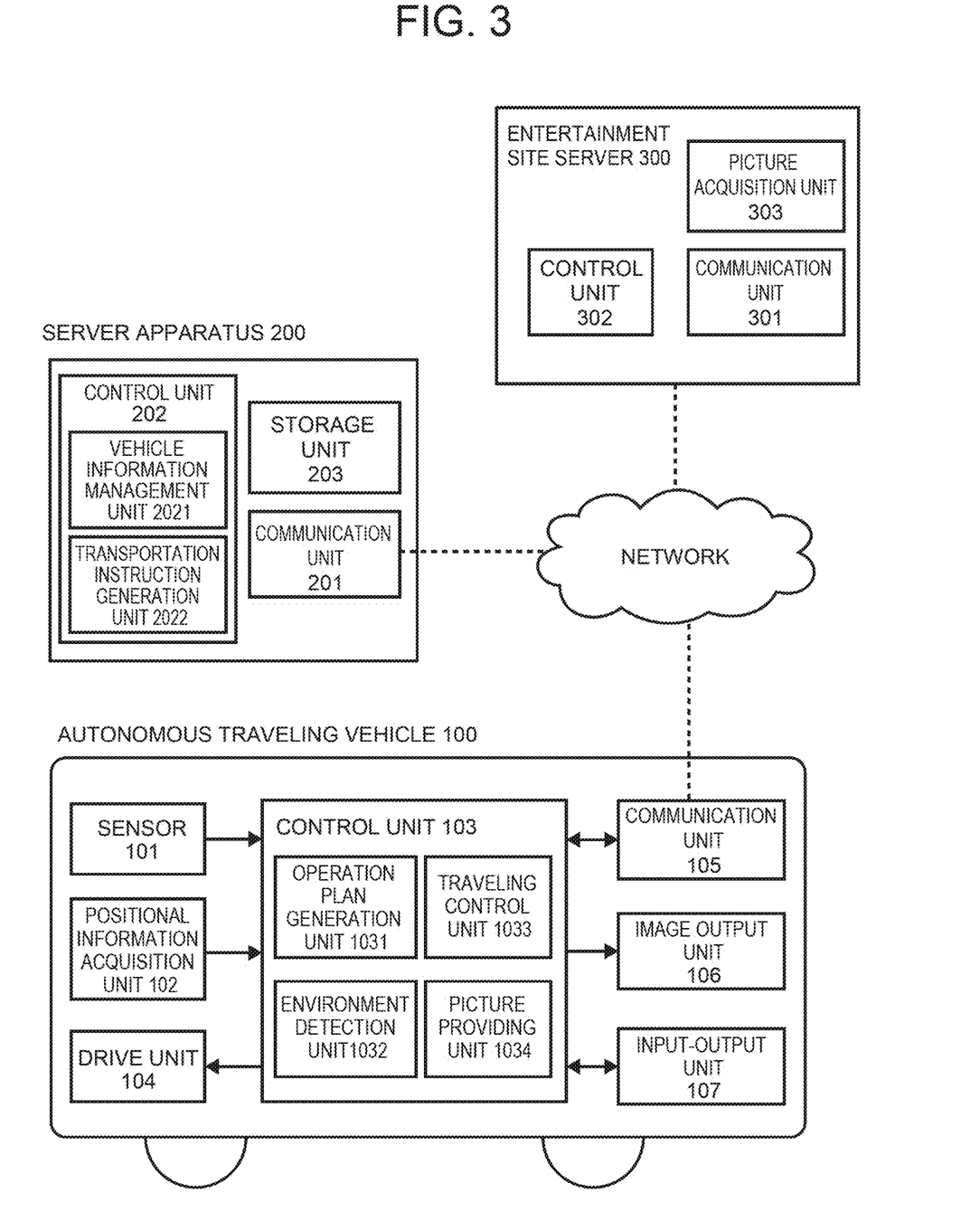
FIG. 3 is a block diagram schematically, exemplarily showing components included in the system.

Next, a module configuration of each apparatus is described with reference to FIG. 3. The autonomous traveling vehicle 100 is a vehicle which autonomously travels based on the transportation instruction acquired from the server apparatus 200 and the information included in the electronic ticket (hereinafter called ticket information). Specifically, it generates a traveling path based on the transportation instruction and the ticket information, and travels on roads in appropriate manners while sensing the surroundings of the vehicle. Moreover, the autonomous traveling vehicle 100 has a function of providing a picture received from the entertainment site server 300 to the user on board.

The autonomous traveling vehicle 100 includes a sensor 101, a positional information acquisition unit 102, a control unit 103, a drive unit 104, a communication unit 105, an image output unit 106 and an input-output unit 107. The autonomous traveling vehicle 100 operates with electric power supplied from a not-shown battery.

The sensor 101 is means for sensing the surroundings of the vehicle, and typically includes any of a laser scanner, a LIDAR, a radar and the like. The information acquired by the sensor 101 is transmitted to the control unit 103. Moreover, the sensor 101 may include a camera provided on the body of the autonomous traveling vehicle 100. For example, an image sensor can be used, such as charge-coupled devices (CCDs), a metal-oxide-semiconductor (MOS) or a complementary metal-oxide-semiconductor (CMOS). Notably, a plurality of cameras may be provided at places on the vehicle body. For example, such cameras may be installed at a front portion, a rear portion and right-and-left lateral portions.

The positional information acquisition unit 102 is means for acquiring a current position of the vehicle, and typically includes a GPS receiver and the like. The information acquired by the positional information acquisition unit 102 is transmitted to the control unit 103.

The control unit 103 is a computer which controls the autonomous traveling vehicle 100 based on the information acquired from the sensor 101. The control unit 103 is configured, for example, of a microcomputer.

The control unit 103 has, as functional modules, an operation plan generation unit 1031, an environment detection unit 1032, a traveling control unit 1033 and a picture providing unit 1034. Each functional module may be realized by executing, with a central processing unit (CPU), a program stored in storage means such as a read-only memory (ROM), these not shown in the figure.

The operation plan generation unit 1031 generates an operation plan of the vehicle based on the transportation instruction acquired from the server apparatus 200 or the read ticket information. In the present embodiment, the operation plan is data in which operation of the vehicle is planned, and can exemplarily include the following data.

(1) Data indicating the traveling path of the vehicle: A path on which the vehicle is to travel may be generated, for example, automatically based on given departure place and destination by referring to map data stored in not-shown storage means. The departure place and the destination can be generated, for example, based on the acquired transportation instruction or ticket information. Notably, the traveling path may be generated using an external service.

(2) Data indicating processes to be performed by the vehicle at places on the path: The processes to be performed by the vehicle can exemplarily include "to allow a person to get in or get off", "to provide guidance to the user on board", and "to collect data", but are not limited to these. The operation plan generated by the operation plan generation unit 1031 is transmitted to the traveling control unit 1033 mentioned later.

The environment detection unit 1032 detects an environment around the vehicle based on the data acquired by the sensor 101. Targets to be detected can exemplarily include the number and positions of lanes, the number and positions of vehicles existing around the vehicle, the number and positions of obstacles existing around the vehicle (such as pedestrians, bicycles, structures and buildings), the structure of the road, traffic signs, and the like, but are not limited to these. There may be any types of detection targets as long as they are needed for autonomous traveling. Moreover, the environment detection unit 1032 may track an object detected. For example, a relative speed of the object may be obtained from a difference between current coordinates of the object and coordinates of the object detected one step before. The data regarding the environment detected by the environment detection unit 1032 (hereinafter called environmental data) is transmitted to the traveling control unit 1033 mentioned later.

The traveling control unit 1033 controls traveling of the vehicle based on the operation plan generated by the operation plan generation unit 1031, the environmental data generated by the environment detection unit 1032, and the positional information of the vehicle acquired by the positional information acquisition unit 102. For example, it causes the vehicle to travel along a predetermined path such that an obstacle does not enter a predetermined safety area with the vehicle as its center. A method of causing the vehicle to autonomously travel can employ a known method.

The picture providing unit 1034 identifies the entertainment site based on the read ticket information, receives and decodes the picture data transmitted from the corresponding entertainment site server 300, and provides it to the user. The picture providing unit 1034 provides the picture transmitted from the entertainment site server 300 to the user via the image output unit 106 mentioned later.

The drive unit 104 is means for causing the autonomous traveling vehicle 100 to travel based on the instruction generated by the traveling control unit 1033. The drive unit 104 exemplarily includes a motor and an inverter for driving wheels, a brake, a steering mechanism, a secondary battery and the like. The communication unit 105 is communication means for connecting the autonomous traveling vehicle 100 to a network. In the present embodiment, it can communicate with another apparatus (for example, the server apparatus 200) via the network using a mobile communication service such as 3G or LTE. Notably, the communication unit 105 may further include communication means for performing inter-vehicle communication with the other autonomous traveling vehicles 100.

Figure 4:
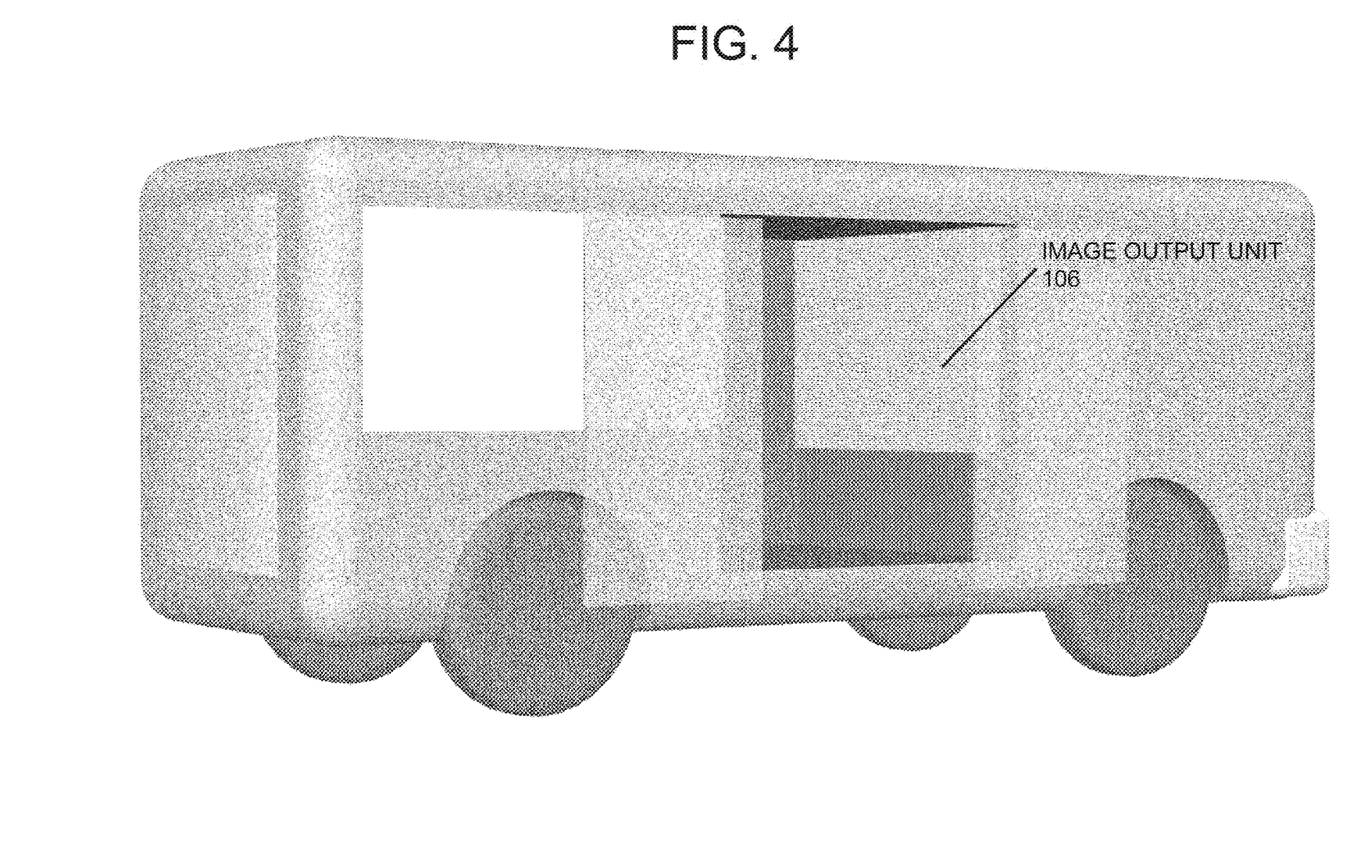
FIG. 4 is a diagram showing an appearance of an autonomous traveling vehicle 100.

The image output unit 106 is means for providing a picture to the user on board. In the present embodiment, the autonomous traveling vehicle 100 has a display apparatus as shown in FIG. 4 in the vehicle cabin, and can output an arbitrary image. The display apparatus may be a liquid crystal display apparatus or may be a head mounted display apparatus or the like.

The input-output unit 107 is means for interacting with the user. Specifically, it is configured of means for reading the electronic ticket held by the user and means for providing information to the user. Notably, the electronic ticket may be read through wireless communication or optically using a two-dimensional bar code or the like. When the electronic ticket is physically read, the reading means may be provided, for example, near a platform of the vehicle or near a seat thereof.

Next, the server apparatus 200 is described. The server apparatus 200 is an apparatus which manages traveling positions and traveling paths of the plurality of autonomous traveling vehicles 100 and generates transportation instructions to the autonomous traveling vehicles 100. For example, when receiving a pickup request from a user, the server apparatus 200 specifies a pickup place, after that, selects an autonomous traveling vehicle 100 that is traveling nearby (that can function as a courtesy vehicle), and transmits a transportation instruction to the vehicle.

The server apparatus 200 includes a communication unit 201, a control unit 202 and a storage unit 203. The communication unit 201 is a communication interface, similar to the communication unit 105, for communicating with the autonomous traveling vehicle 100 via the network.

The control unit 202 is means for conducting control of the server apparatus 200. The control unit 202 is configured, for example, of a CPU. The control unit 202 includes, as functional modules, a vehicle information management unit 2021 and a transportation instruction generation unit 2022. Each functional module may be realized by executing, with the CPU, a program stored in storage means such as a ROM, these not shown in the figure.

The vehicle information management unit 2021 manages the plurality of autonomous traveling vehicles 100 under the control. Specifically, for every predetermined cycle, it receives positional information, path information and event information from the plurality of autonomous traveling vehicles 100, and associates them with the date and time to store them in the storage unit 203 mentioned later. The positional information is information indicating current positions of the autonomous traveling vehicles 100, and the path information is information regarding paths on which the autonomous traveling vehicles 100 are scheduled to travel. The event information is information regarding events arising on the autonomous traveling vehicles 100 in service (for example, users' getting in and getting off, arrival at destinations, and the like).

Moreover, the vehicle information management unit 2021 holds and updates data regarding characteristics of the autonomous traveling vehicles 100 (hereinafter called vehicle information) as needed. The vehicle information exemplarily includes identifiers, purposes and types, door types, body sizes, loading capacities, passenger capacities, distances drivable to empty from full charge, distances currently drivable, current statuses (waiting, vacant, occupied, traveling, in service and the like), and the like of the autonomous traveling vehicles 100, but may include others.

In the present embodiment, the pickup request is information including a desired pickup place and a desired pickup time. The pickup request is acquired, for example, from the user via the network. Notably, a source which transmits the pickup request is not necessarily an ordinary user but, for example, may be a company operating the autonomous traveling vehicles 100, or the like.

When externally receiving the pickup request, the transportation instruction generation unit 2022 determines the autonomous traveling vehicle 100 that allows the user to get in, and generates the transportation instruction to be transmitted to that autonomous traveling vehicle 100.

The storage unit 203 is means for storing information, and is configured of a storage medium such as a RAM, a magnetic disk and a flash memory.

Next, the entertainment site servers 300 are described. The entertainment site servers 300 are server apparatuses installed for individual entertainment sites, and apparatuses which capture pictures of entertainments held at the entertainment sites, such as games, dramas and concerts, and distribute the pictures. Upon receiving a request from the autonomous traveling vehicle 100, the entertainment site server 300 distributes the designated picture to the autonomous traveling vehicle 100.

The entertainment site server 300 has a communication unit 301, a control unit 302 and a picture acquisition unit 303. The communication unit 301 is a communication interface, similar to the communication unit 201, for communicating with the autonomous traveling vehicles 100 via the network.

The control unit 302 is means for conducting control of the entertainment site server 300. The control unit 302 is configured, for example, of a CPU. The control unit 302 executes a function of distributing a picture acquired by the picture acquisition unit 303 mentioned later via the network. The function may be realized by executing, with the CPU, a program stored in storage means such as a ROM.

The picture acquisition unit 303 is means for acquiring a picture signal captured by one or more cameras installed on the field and at audience seats. When a plurality of cameras are installed at the entertainment site, the picture acquisition unit 303 may acquire a plurality of picture signals. The picture signal acquired by the picture acquisition unit 303 is converted into the picture data by the control unit 302 to be distributed via the network. Notably, when the picture acquisition unit 303 can acquire a plurality of picture signals, a plurality of pictures on channels may be integrated into one data stream.

Figures 5A, 5B:
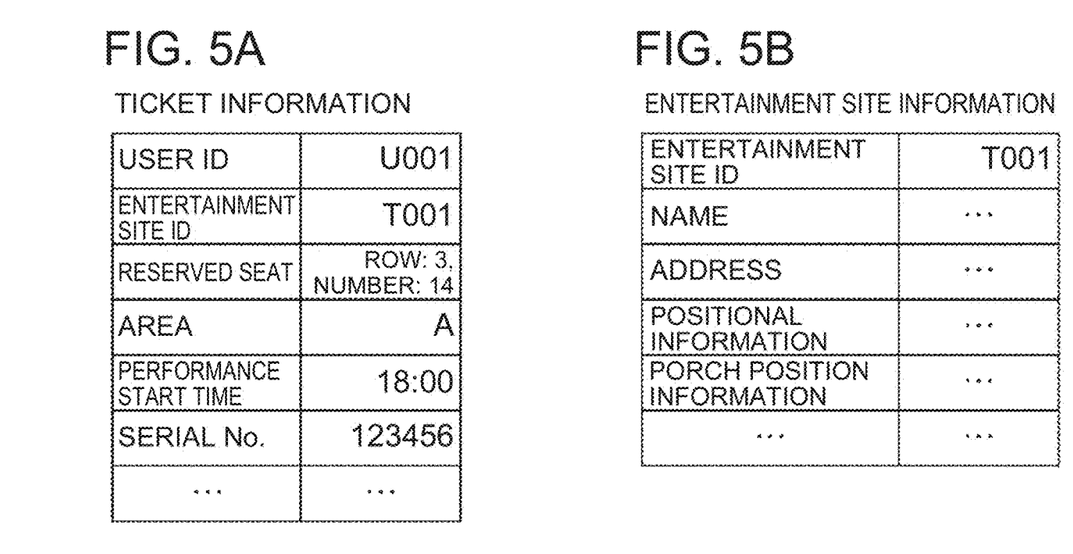
FIG. 5A is a diagram exemplarily showing data used by the movable body system.
FIG. 5B is a diagram exemplarily showing data used by the movable body system.

Next, processing performed by the autonomous traveling vehicle 100 that has allowed the user to get in is specifically described. FIG. 5A exemplarily shows ticket information readable from the electronic ticket held by the user. The ticket information includes an ID for uniquely identifying the user, an ID for uniquely identifying the entertainment site, information regarding a seat reserved for the user, information regarding an area where the seat exists (for example, a first-base side seat, a third-base side seat, a special seat (S-seat), an ordinary seat (A-seat), or the like), a performance start time, and the like. The ticket information may include information for authenticating the user about to get in.

When the user gets in the autonomous traveling vehicle 100 and allows the electronic ticket to be read, the operation plan generation unit 1031 specifies a destination based on the entertainment site ID included in the ticket information, and prestored entertainment site information, and generates a traveling path to reach the destination. FIG. 5B exemplarily shows the entertainment site information stored in the autonomous traveling vehicle 100. The information includes the ID for uniquely identifying the entertainment site, a name and an address of the entertainment site, positional information of a facility or a porch, and the like. The operation plan generation unit 1031 generates the traveling path based on the entertainment site information and separately acquired map data.

Figure 5C:
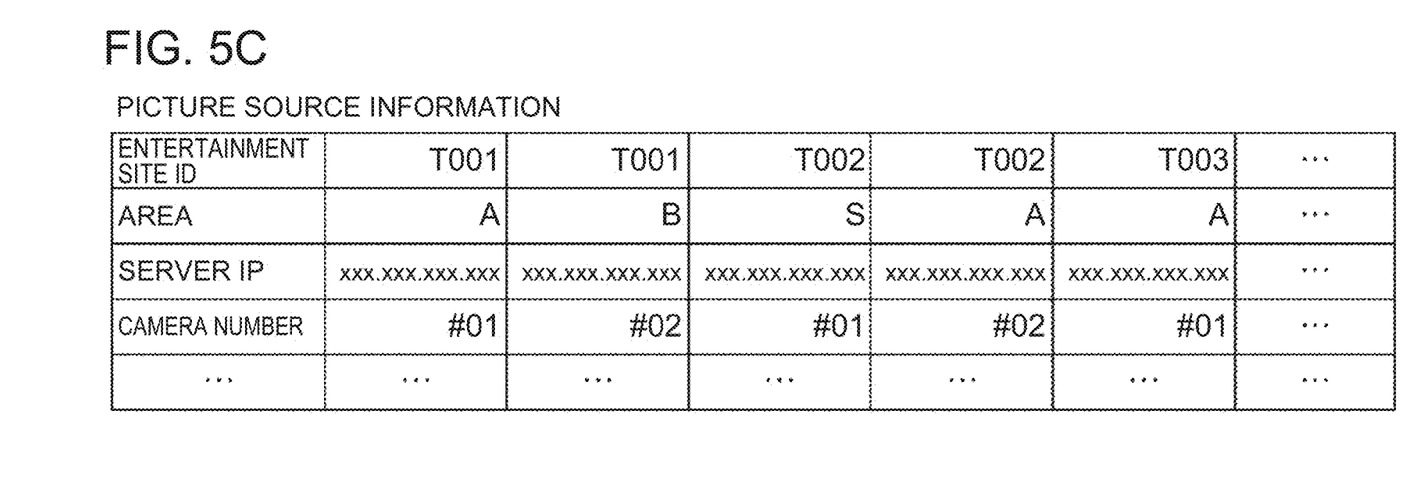
FIG. 5C is a diagram exemplarily showing data used by the movable body system.

When it is past the performance start time while the user is on board, the picture providing unit 1034 specifies the entertainment site server 300 based on the identified entertainment site ID and prestored picture source information, and receives picture data distributed from that entertainment site server 300. FIG. 5C exemplarily shows the picture source information stored in the autonomous traveling vehicle 100. The information includes the ID for uniquely identifying the entertainment site, an area, an address of a server apparatus, a camera number, and the like.

The picture providing unit 1034 selects the corresponding picture source (server) based on the entertainment site ID and the area included in the ticket information, and receives the picture data. Notably, when a plurality of cameras are installed at the entertainment site, by designating the corresponding camera number, the corresponding picture can be extracted from the received picture data. The extracted picture is converted into a picture signal to be provided to the user via the image output unit 106.

Figure 6:
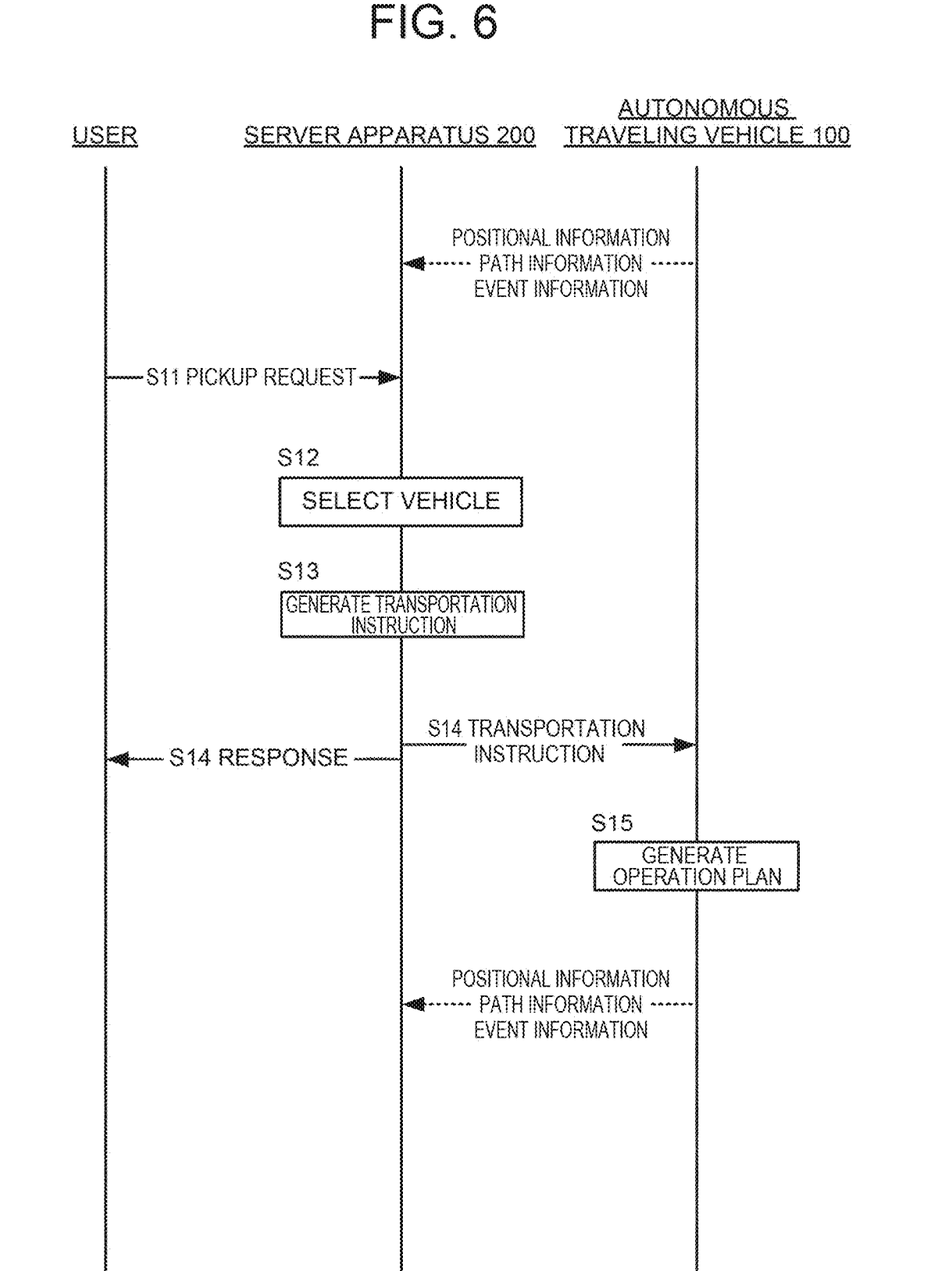
FIG. 6 is a flow diagram showing flows of data between the components of the system.

Next, processing performed by each element constituting the system is described. FIG. 6 is a diagram for explaining dataflows until the server apparatus 200 generates the transportation instruction based on the pickup request transmitted from the user and the autonomous traveling vehicle 100 starts to operate.

The autonomous traveling vehicle 100 periodically transmits the positional information, the path information and the event information to the server apparatus 200. Notably, the positional information and the path information are transmitted every time with the elapse of time. The event information is transmitted at the occurrence of an event (for example, user's getting in or getting off, or the like) as a trigger. The server apparatus 200 (vehicle information management unit 2021) having received these pieces of information stores, in the storage unit 203, the received pieces of information in association with an identifier of the autonomous traveling vehicle 100. Notably, the positional information is not necessarily positional information of a node. For example, it may be information for specifying a node or a link. Moreover, a link may be divided into a plurality of sections. Moreover, a road network is not necessarily represented by nodes and links.

When the user transmits the pickup request to the server apparatus 200 (step S11), the server apparatus 200 (transportation instruction generation unit 2022) selects the autonomous traveling vehicle 100 based on the pickup request by the aforementioned method (step S12). Then, the transportation instruction is generated for the selected autonomous traveling vehicle 100 (step S13). The transportation instruction exemplarily includes information regarding the user, a pickup place where the user wants to get on, a desired pickup time, and the like. In step S14, the transportation instruction generation unit 2022 transmits the transportation instruction to the targeted autonomous traveling vehicle 100. Moreover, a response including an affirmative or a negative of pickup, a pickup place, a scheduled arrival time, and the like is transmitted to the user.

In step S15, the autonomous traveling vehicle 100 (operation plan generation unit 1031) generates the operation plan based on the received transportation instruction. For example, when the autonomous traveling vehicle 100 is not in service, it generates an operation plan of allowing the user to get in at the predetermined pickup place and going toward the predetermined entertainment site based on the read ticket information. When the autonomous traveling vehicle 100 is in service, it modifies an operation plan that have been already determined, for allowing the user who wants to get in to get in anew. The generated or modified operation plan is transmitted to the traveling control unit 1033. Upon this, the autonomous traveling vehicle 100 starts to move.

When the autonomous traveling vehicle 100 arrives at the place designated by the user, the traveling control unit 1033 allows the user to get in and performs processing of reading the electronic ticket. Thereby, a new operation plan for transporting the user to the predetermined entertainment site is generated.

Figure 7:
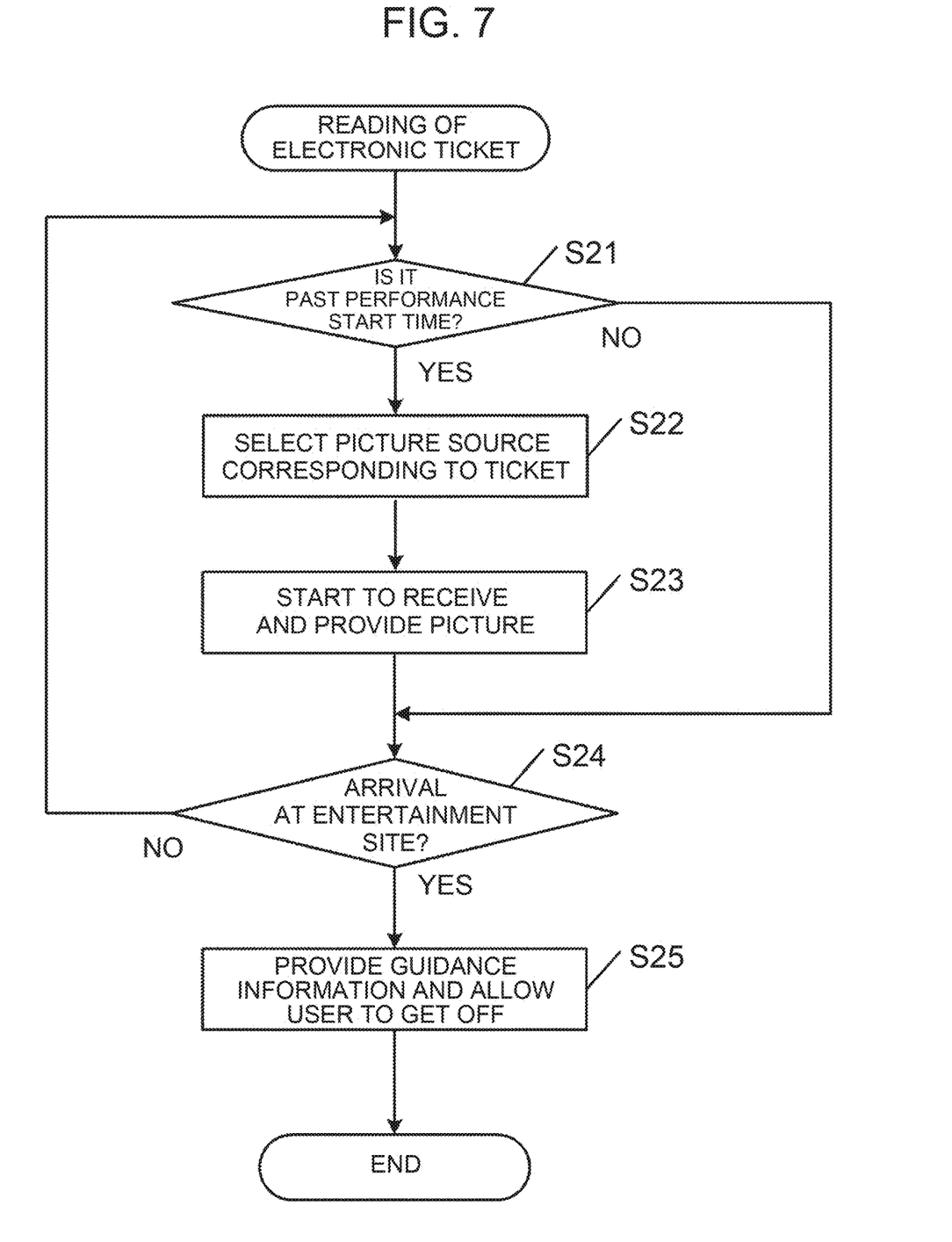
FIG. 7 is a flowchart of processing in a first embodiment.

Next, processing of providing a picture to the user who has got in is described. FIG. 7 is a flowchart of processing performed by the autonomous traveling vehicle 100 (picture providing unit 1034) when the user gets in the autonomous traveling vehicle 100. The flowchart starts in timing when the ticket information is acquired and the vehicle starts to move.

First, in step S21, the performance start time included in the ticket information and the current time are compared with each other, and determines whether or not it is past the performance start time. Herein, in the case of negative determination, the process proceeds to step S24 mentioned later. In the case of affirmative determination, the corresponding picture source is selected in step S22. Specifically, the targeted picture source is selected from the picture source information shown in FIG. 5C based on the entertainment site ID and the area included in the ticket information. Then, in step S23, the autonomous traveling vehicle 100 connects to the entertainment site server 300 and starts to receive the picture. The received picture is provided to the user via the image output unit 106.

In step S24, it is determined whether or not the autonomous traveling vehicle 100 arrives at the entertainment site. Herein, in the case of negative determination, the process proceeds to step S21. In the case of affirmative determination, information is provided to the user on board based on the ticket information. For example, guidance on an entrance of the site, guidance to the area, guidance to the reserved seat, and the like are generated and provided to the user via the image output unit 106 or the input-output unit 107. Notably, information for such guidance (directory of the site, or the like) may be included in the ticket information or may be externally acquired.

As described above, the movable body system according to the present embodiment can transport the user to the entertainment site based on the information acquired from the electronic ticket held by the user who is going to go to the entertainment site. Moreover, since it can provide relayed pictures of the entertainment in real time to the user in the vehicle, the user can flexibly make an action schedule without restriction of the performance start time.

Second Embodiment

For the first embodiment, a mode of transporting a user who is going to go to an entertainment site has been exemplarily presented. Meanwhile, a second embodiment is an embodiment of transporting a user who is to leave an entertainment site in the middle of a public performance.

In the second embodiment, the ticket information includes information for designating a place where the user who is leaving to home is going to get off the autonomous traveling vehicle 100. Moreover, when the electronic ticket is read at the entertainment site included in the ticket information, the autonomous traveling vehicle 100 starts to move for sending the user. That is, it generates a traveling path in which the entertainment site is the departure place and a designated place where the user is going to get off is the destination, and generates an operation plan of transporting the user on the traveling path.

Figure 8:
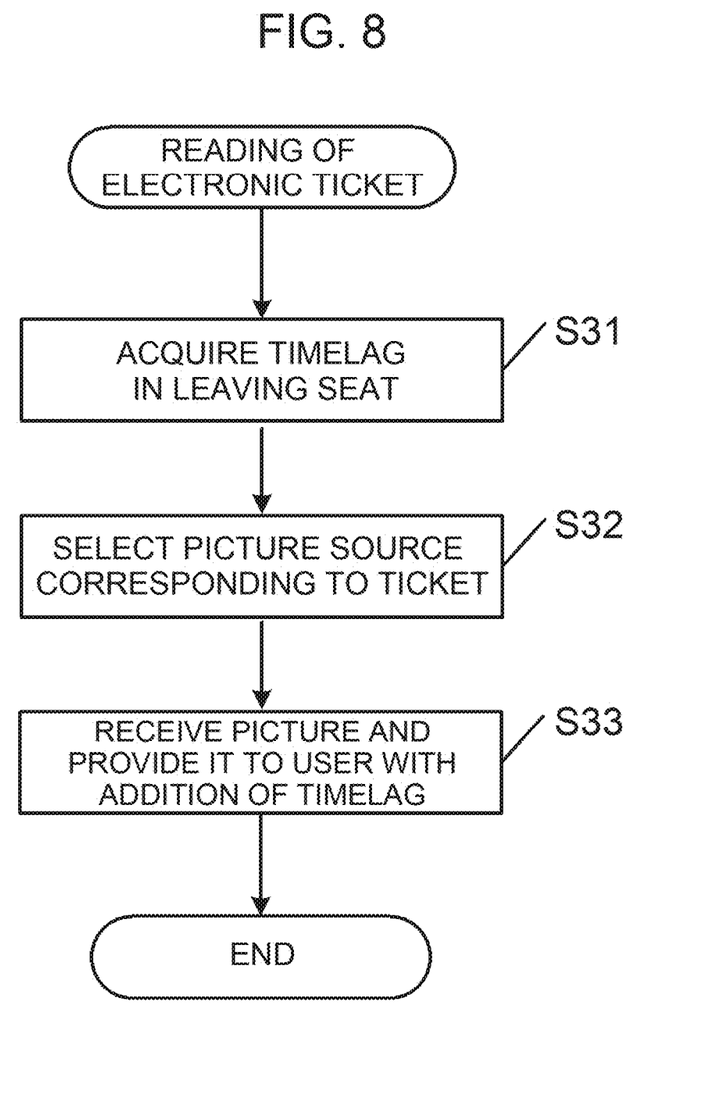
FIG. 8 is a flowchart of processing in a second embodiment.

FIG. 8 is a flowchart of processing performed by the autonomous traveling vehicle 100 (picture providing unit 1034) in the second embodiment. The flowchart starts in timing when the ticket information is acquired from the user to leave the entertainment site and the vehicle starts to operate.

First, in step S31, a timelag from user's leaving the seat to user's getting in the autonomous traveling vehicle 100 is acquired. Timing when the user leaves the seat can be acquired, for example, from a terminal held by the user (hereinafter called a user terminal). For example, when an application program for accepting issuance of the electronic ticket is operating on the user terminal, the timing when the user leaves the seat can be reported to the autonomous traveling vehicle 100 via the application program. A process in step S32 is similar to that in step S22 and its description is omitted.

When the user leaves the seat in the middle of the public performance, the user cannot watch the public performance between the time of leaving and the time of getting in the autonomous traveling vehicle 100. Therefore, in the second embodiment, the picture providing unit 1034 accumulates the picture for a predetermined period, and when the picture is provided to the user in step S33, provides it to the user with an addition of the timelag determined in step S31. For example, when it takes 10 minutes to get in from leaving, the picture is provided to the user with a delay of 10 minutes.

According to the second embodiment, even after the user leaves the seat in the middle of the public performance, the picture at the site can be seamlessly provided to the user. That is, the user can more flexibly make an action schedule.

Modification

The embodiments above are merely exemplary, and the disclosure can be properly modified and implemented without departing from the scope and spirit thereof. The processing and means described in the present disclosure can be freely combined and implemented as long as they do not technically conflict.

Moreover, a process that has been described as being performed by one apparatus may be shared and performed by a plurality of apparatuses. Meanwhile, processes that have been described as being performed by different apparatuses may be performed by one apparatus. What kind of hardware configuration (server configuration) realizes each function in the computer system can be flexibly modified.

The disclosure can also be realized by supplying a computer program in which the functions described for any of the embodiments above are implemented to a computer and reading and executing the program with one or more processors included in the computer. Such a computer program may be provided to the computer via a non-transitory computer-readable storage medium connectable to a system bus of the computer, or may be provided to the computer via a network. Examples of the non-transitory computer-readable storage medium include any types of disks and discs such as magnetic disks (floppy (R) disks, hard disk drives (HDDs) and the like), and optical discs (CD-ROMs, DVD discs, Blu-ray discs and the like), a read-only memory (ROM), a random access memory (RAM), an EPROM, an EEPROM, a magnetic card, a flash memory, an optical card, and any types of medium suitable for storing electronic instructions.

What is claimed is:

1. An information processing apparatus, comprising:
a controller that executes:
electronically reading an entertainment ticket held by a user;
identifying an entertainment site associated with the entertainment ticket;
generating an instruction for causing a movable body to transport the user to an/or from the identified entertainment site;
receiving picture data transmitted from the identified entertainment site; and
providing a picture obtained by decoding the picture data to the user on board the movable body.

2. The information processing apparatus according to claim 1, wherein the picture data includes a plurality of pictures, on channels, captured by respective cameras installed at different areas in the entertainment site; and
the controller identifies an area, in the entertainment site, designated by the entertainment ticket, and extracts a picture on a channel corresponding to the identified area from the picture data.

3. The information processing apparatus according to claim 1, wherein when the user returns from the entertainment site, the controller acquires a time from user's leaving a seat to user's getting in the movable body, and provides the picture to the user with a delay of the time.

4. The information processing apparatus according to claim 1, further comprising:
a storage that stores a plurality of addresses of servers that distribute the picture data,
wherein the controller connects to a server corresponding to the identified entertainment site.

5. An information processing method, comprising:
electronically reading, with a controller of an information processing apparatus, an entertainment ticket held by a user;
identifying, with the controller of the information processing apparatus, an entertainment site associated with the entertainment ticket;
generating, with the controller of the information processing apparatus, an instruction for causing a movable body to transport the user to an/or from the identified entertainment site;
receiving, with the controller of the information processing apparatus, picture data transmitted from the identified entertainment site; and
providing, with the controller of the information processing apparatus, a picture obtained by decoding the picture data to the user on board the movable body.

6. The information processing method according to claim 5, wherein the picture data includes a plurality of pictures, on channels, captured by respective cameras installed at different areas in the entertainment site; and
the method further comprises identifying an area, in the entertainment site, designated by the entertainment ticket, and extracting a picture on a channel corresponding to the identified area from the picture data.

7. The information processing method according to claim 5, further comprising, when the user returns from the entertainment site, acquiring a time from user's leaving a seat to user's getting in the movable body, and providing the picture to the user with a delay of the time.

8. The information processing method according to claim 5, further comprising:
storing, in a storage, a plurality of addresses of servers that distribute the picture data; and
causing the controller to connect to a server corresponding to the identified entertainment site.

9. A non-transitory computer-readable medium encoded with computer-readable instructions that, when executed by a controller of an information processing apparatus, cause the controller to perform an information processing method, comprising:

electronically reading an entertainment ticket held by a user;

identifying an entertainment site associated with the entertainment ticket;

generating an instruction for causing a movable body to transport the user to an/or from the identified entertainment site;

receiving picture data transmitted from the identified entertainment site; and     providing a picture obtained by decoding the picture data to the user on board the movable body.

10. The non-transitory computer-readable medium according to claim 9, wherein the picture data includes a plurality of pictures, on channels, captured by respective cameras installed at different areas in the entertainment site; and the method further comprises identifying an area, in the entertainment site, designated by the entertainment ticket, and extracting a picture on a channel corresponding to the identified area from the picture data.

11. The non-transitory computer-readable medium according to claim 9, further comprising, when the user returns from the entertainment site, acquiring a time from user's leaving a seat to user's getting in the movable body, and providing the picture to the user with a delay of the time.

12. The non-transitory computer-readable medium according to claim 9, further comprising:

storing, in a storage, a plurality of addresses of servers that distribute the picture data; and     causing the controller to connect to a server corresponding to the identified entertainment site.

\* \* \* \* \*